(12) United States Patent
Sarma et al.

(10) Patent No.: US 7,621,447 B1
(45) Date of Patent: Nov. 24, 2009

(54) METHOD AND APPARATUS FOR ROUTING DATA IN AN AUTOMATIC IDENTIFICATION SYSTEM

(75) Inventors: Sanjay Sarma, Belmont, MA (US); Daniel W. Engels, Lincoln, MA (US); Laxmiprasad Putta, Wellesley, MA (US); Sridhar Ramachandran, Watertown, MA (US); James L. Waldrop, Somerville, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 389 days.

(21) Appl. No.: 10/769,292

(22) Filed: Jan. 30, 2004

Related U.S. Application Data

(60) Provisional application No. 60/444,090, filed on Jan. 31, 2003.

(51) Int. Cl.
G06F 19/00 (2006.01)

(52) U.S. Cl. .................. 235/385; 235/383; 235/492; 705/22; 707/203

(58) Field of Classification Search .................. 235/383, 235/385, 377, 487, 472.02, 492; 705/22; 707/203, 204
See application file for complete search history.

(56) References Cited

U.S. PATENT DOCUMENTS

| | | | | |
|---|---|---|---|---|
| 5,305,196 A | * | 4/1994 | Deaton et al. | 705/10 |
| 5,388,252 A | * | 2/1995 | Dreste et al. | 714/46 |
| 5,434,394 A | * | 7/1995 | Roach et al. | 235/375 |
| 5,448,046 A | * | 9/1995 | Swartz | 235/432 |
| 5,780,826 A | * | 7/1998 | Hareyama et al. | 235/385 |
| 5,857,190 A | * | 1/1999 | Brown | 707/10 |
| 5,886,634 A | * | 3/1999 | Muhme | 340/572.1 |
| 6,125,392 A | * | 9/2000 | Labatte et al. | 709/224 |
| 6,148,338 A | * | 11/2000 | Lachelt et al. | 709/224 |
| 6,308,888 B1 | * | 10/2001 | Swartz | 235/385 |
| 6,388,569 B1 | * | 5/2002 | Engellenner | 340/505 |
| 6,567,116 B1 | * | 5/2003 | Aman et al. | 348/169 |
| 6,577,275 B2 | * | 6/2003 | Turner | 342/465 |
| 6,606,744 B1 | * | 8/2003 | Mikurak | 705/26 |
| 6,681,990 B2 | * | 1/2004 | Volger et al. | 235/385 |
| 6,693,539 B2 | * | 2/2004 | Bowers et al. | 340/572.1 |
| 6,732,934 B2 | * | 5/2004 | Hamilton et al. | 235/472.01 |
| 6,766,947 B2 | * | 7/2004 | Wan et al. | 235/383 |
| 6,806,813 B1 | * | 10/2004 | Cheng et al. | 235/385 |

(Continued)

OTHER PUBLICATIONS

Sarma; Engels; Putta; Ramachandran; Waldrop; The Savant, Technical Manual, Published Feb. 1, 2002, entire article, Oat Systems and MIT Auto ID Center, Cambridge, MA.

(Continued)

*Primary Examiner*—Seung H Lee
(74) *Attorney, Agent, or Firm*—Dann, Dorfman, Herrell & Skillman, PC

(57) ABSTRACT

A control system for routing data in an automatic identification system includes an event management system (EMS), a real-time in-memory data structure (RIED) and a task management system (TMS). The control system can be provided in a distributed hierarchical arrangement. The EMS of each control system can include filters which limit the amount of information provided to the next level in the hierarchy. In this manner the hierarchical control system network acts as a high volume data collector and processor. In some embodiments a level of the hierarchy can be removed spatially and/or temporally from an adjacent level in the hierarchy.

31 Claims, 8 Drawing Sheets

U.S. PATENT DOCUMENTS

| | | | | |
|---|---|---|---|---|
| 6,843,415 | B2* | 1/2005 | Vogler | 235/385 |
| 7,010,530 | B2* | 3/2006 | Bartkowiak et al. | 707/9 |
| 7,035,877 | B2* | 4/2006 | Markham et al. | 707/200 |
| 7,284,016 | B2* | 10/2007 | Venkatesh et al. | 707/200 |
| 2002/0185532 | A1* | 12/2002 | Berquist et al. | 235/385 |

OTHER PUBLICATIONS

National Hockey League, "Rule 2 Dimensions of Rink", NHL Rulebook, http://www.nhl.com/hockeyu/rulebook/rule02.html, printed Oct. 30, 2007, 1 page.

Emporis.com, Second Madison Square Garden, New York City, http://www.emporis.com/en/wm/bu/?id=2madisonsquaregarden-newyorkcity-ny-usa, printed Oct. 30, 2007, 2 pages.

Emporis.com, Staples Center, Los Angeles, http://www.emporis.com/en/wm/bu/?id=staplescenter-losangeles-usa, printed Oct. 30, 2007, 2 pages.

Sports Venue Technology, Staples Center, Los Angeles, CA, USA, http://www.sportsvenue-technology.com/projects/staples/index.html, printed Oct. 30, 2007, 3 pages.

Sports Venue Technology, The playing area of Staples Center, http://www.sportsvenue-technology.com/projects/staples/staples7.html, © 2007, printed Oct. 30, 2007, 1 page.

Sports Venue Technology, From above the LED screens looking onto the playing area, http://www.sportsvenue-technology.com/projects/staples/staples8.html, © 2007, printed Oct. 30, 2007, 1 page.

Seats 3D, Denver Nuggets, Section 380, Rows 11-16, http://www.seats3d.com/nba/denver_nuggets/sec_380_2.html?price_plan_selected=&, printed Oct. 30, 2007, 1 page.

Technovelgy.com, Passive RFID Tag (or Passive Tag), http://www.technovelgy.com/ct/technology-article.asp?artnum=47, printed Nov. 6, 2007, 3 pages.

Technovelgy.com, Active Tag (or Active RFID Tag), http://www.technovelgy.com/ct/technology-article.asp?artnum=21, printed Nov. 6, 2007, 3 pages.

RFID Journal, Frequently Asked Questions, The EPCglobal Network, "What is the Object Naming Service?", http://www.rfidjournal.com/faq/24/114, printed Oct. 16, 2007, 1 page.

EPCglobal, "Reader Protocol Standard, Version 1.1", Jun. 21, 2006, 275 pages http://www.epcglobalinc.org/standards/rp.

EPCglobal, "Reader Management 1.0.1", May 31, 2007, 242 pages http://www.epcglobalinc.org/standards/rm.

EPCglobal, "Object Naming Service, Version 1.0", Oct. 4, 2005, 24 pages http://www.epcglobalinc.org/standards/ons.

EPCglobal, "Low Level Reader Protocol (LLRP), Version 1.0.1", Aug. 13, 2007, 194 pages http://www.epcglobalinc.org/standards/llrp.

EPCglobal, "EPC Information Services, Version 1.0.1", Sep. 21, 2007, 146 pages http://www.epcglobalinc.org/standards/epcis.

EPCglobal, "The Application Level Events (ALE) Specification, Version 1.0", Sep. 15, 2005, 71 pages http://www.epcglobalinc.org/standards/ale.

EPCglobal, "EPC Radio Frequency Identity Protocols Class-1 Generation-2 UHF RFID Protocol for Communications at 860 MHz—960 MHz, Version 1.0.9", Jan. 2005, 94 pages http://www.epcglobalinc.org/standards/uhfc1g2.

EPCglobal, "EPCglobal Tag Data Standards, Version 1.3.1", Mar. 8, 2006, 99 pages http://www.epcglobalinc.org/standards/tds/.

RFIDexchange, RFID Design, Manufacturing and Consulting Companies, Readers, http://www.rfidexchange.com/manufacturers.aspx?topic_type=r, printed Nov. 6, 2007, 18 pages.

RFIDexchange, RFID Design, Manufacturing and Consulting Companies, Passive Tags, http://www.rfidexchange.com/manufacturers.aspx?topic_type=pt, printed Nov. 6, 2007, 13 pages.

* cited by examiner

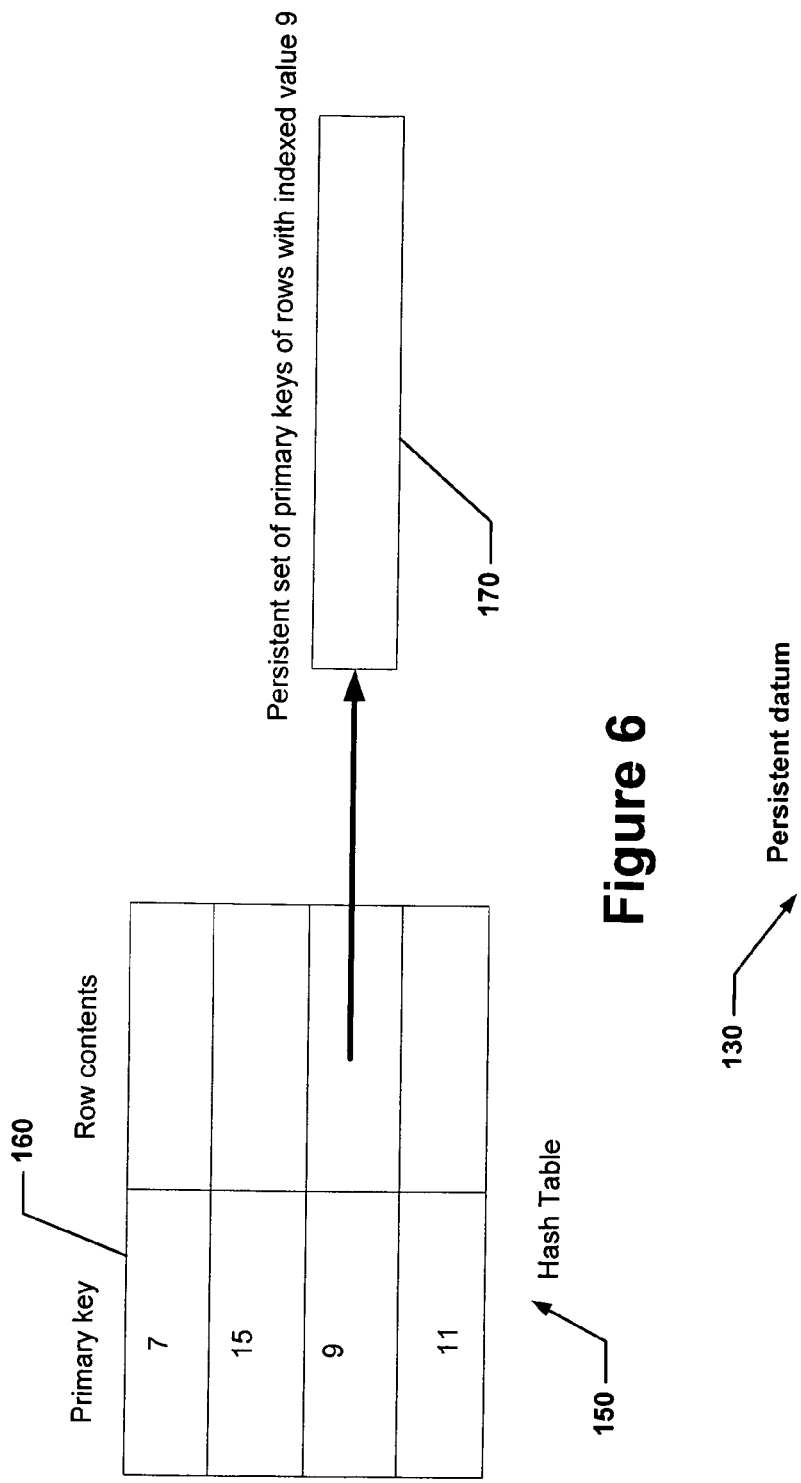

METHOD AND APPARATUS FOR ROUTING DATA IN AN AUTOMATIC IDENTIFICATION SYSTEM

CROSS REFERENCE TO RELATED APPLICATIONS

This application claims the benefit of provisional application No. 60/444,090 filed Jan. 31, 2003, the disclosure of which is hereby incorporated by reference.

STATEMENT REGARDING FEDERALLY SPONSORED RESEARCH

Not Applicable.

FIELD OF THE INVENTION

The present invention relates generally to a network service and related apparatus and more particularly to a service for identifying objects based upon a unique code associated with that object.

BACKGROUND OF THE INVENTION

As is known in the art, the ability to uniquely identify items, devices, and services (collectively called "objects") is essential for many applications including but not limited to 20 security access control, supply chain management and communications. The inability to uniquely identify every object of interest renders many of these applications less effective than is generally desired. One component for unique identification is the association of a unique identifier with the object. The identifier may take many forms, such as a given name or number (e.g., a social security number) or a characteristic of the object (e.g., a fingerprint). Once objects are uniquely identified, it would be desirable to locate data about the object or service using the unique identifier.

In a world in which every object has an associated electronic product code (EPC) which may be attached or associated to the object with a Radio Frequency Identification (RFID) tag for example, EPC readers (e.g., RFID tag readers) will be picking up a continual stream of EPCs. It has, therefore, been recognized that managing and moving all of this data is a difficult problem and one that must be addressed in an RFID network. One embodiment of a RFID system is described in U.S. patent application Ser. No. 09/379,187 filed on Aug. 20, 1999 which claims the benefit of application No. 60/097,254 filed Aug. 20, 1998.

SUMMARY OF THE INVENTION

In accordance with the present invention, a system for routing data in an automatic identification system includes an event management system (EMS), a real-time in-memory data structure (RIED) coupled to the EMS, the RIED for storing event information gathered by the EMS and a task management system (TMS) for ensuring that the RIED is updated by one transaction at a time. With this particular arrangement, a system for managing a large number of real-time events is provided. In one embodiment, the control system can be provided in a distributed hierarchical arrangement. The EMS of each control system can include filters which limit the amount of information provided to the next level in the hierarchy. In this manner the hierarchical control system network acts as a high volume data collector and processor. In some embodiments a level of the hierarchy can be removed spatially and/or temporally from an adjacent level in the hierarchy. This approach results in an intelligent network and also lends itself to scalability. By including optional filters and queues in the EMS, the EMS can be configured as desired.

BRIEF DESCRIPTION OF THE DRAWINGS

The invention will be more fully understood from the following detailed description taken in conjunction with the accompanying drawings, in which:

FIG. 6 is a persistent set Hash table;

FIG. 7 is a table which illustrates a sample persistent datum;

DETAILED DESCRIPTION OF THE INVENTION

Before describing the processing to be performed by an automatic identification (control) system to manage and move data, it should be appreciated that, in an effort to promote clarity, reference is sometimes made herein to certain exemplary embodiments and applications—e.g., supply chain management applications. Such reference should not be taken as limiting the invention to such embodiments and applications. Rather, it should be understood that such examples are intended only as an aid to describing the invention and that the present invention finds use in a wide variety of different applications including but not limited to communications networks, power networks, chemical supply networks, supply chain networks, transportation systems and security.

Accordingly, those of ordinary skill in the art will appreciate that the description and processing taking place on supply chain systems could equally be taking place on communications systems, transportations systems, security systems or any other type of system. Likewise, reference is sometimes made herein to radio frequency (RF) ID tags. Passive RFID tags having an operating range up to about two meters may be used. It should be appreciated, however, that the present invention can be used with any type of identifier including but not limited to RF ID tags.

Likewise the operating environment referred to herein as "Savant" has application to any distributed system and in particular can be used to tie together many events in any sensor network. Thus, control systems can be provided as global infrastructures to track objects by tagging the objects with unique Electronic Product Codes (EPCs) stored, for example, in radio frequency (RF) tags. In a preferred embodiment, the control system is a modular platform which manages EPC data. As will be described herein below, a hierarchical setup of geographically distributed control systems can manage EPC data throughout an enterprise.

The Savant operating environment described herein utilizes a distributed architecture and is organized in a hierarchy that manages the flow of data. These control systems will be implemented in stores, distribution centers, regional offices, factories, trucks and in cargo planes. Control systems at each level will gather, store and act on information and interact with other control systems. For instance, a control system at a store might inform a distribution center that more product is needed. A control system at the distribution center might inform the store control system that a shipment was dispatched at a specific time. The control system will handle a variety of tasks including but not limited to data smoothing, reader coordination, data forwarding, data storage and task management.

Figure 1:
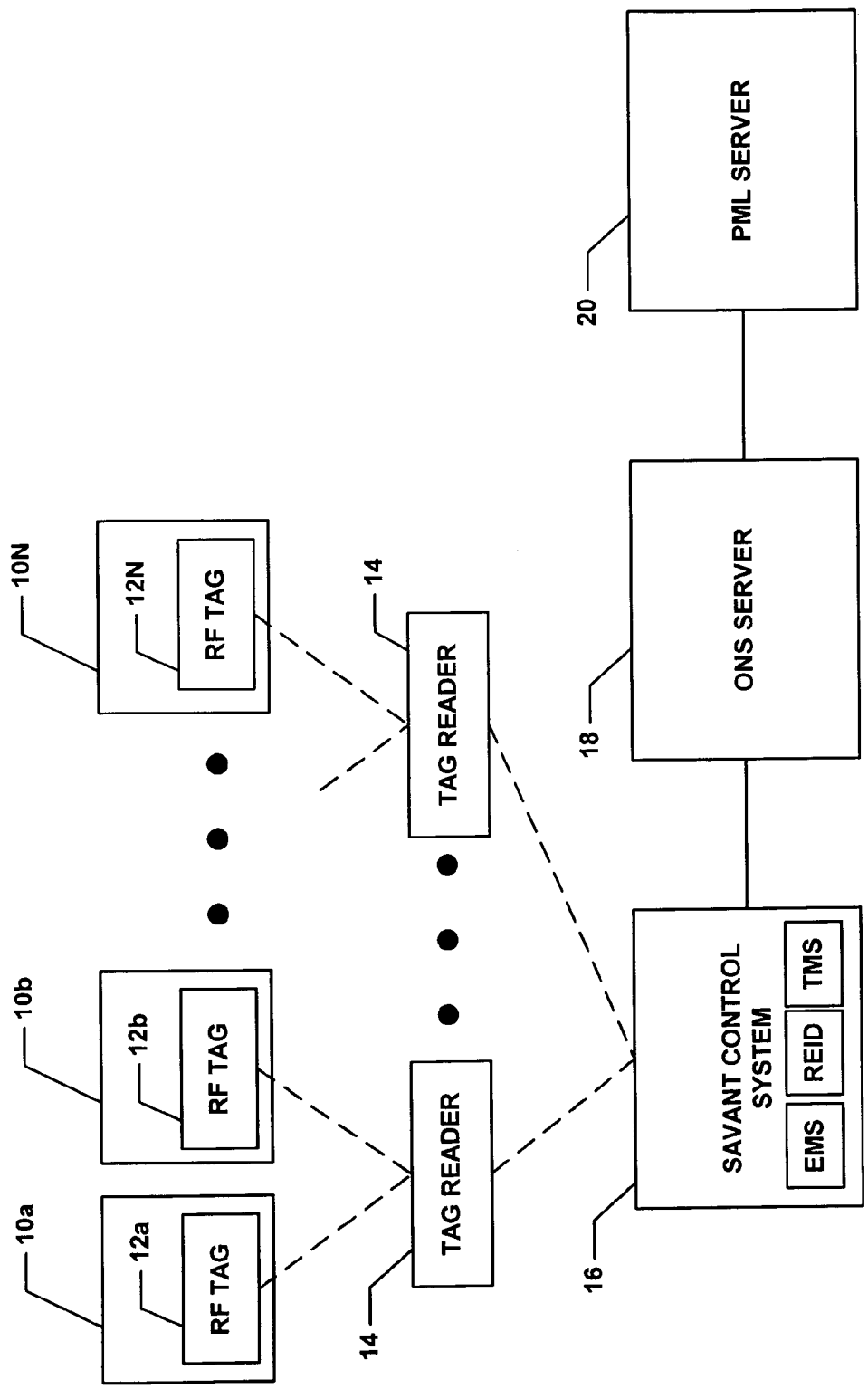
FIG. 1 is a block diagram of an automatic identification (control) system.

Referring now to FIG. 1, each of a plurality of objects 10a-10N has an electronic product code (EPC) 12a-12N associated with or "tagged" thereon. In one embodiment, each EPC is unique and is associated with an object via a radio frequency (RF) tag in which case the EPC can be said to be provided as a radio frequency identifier (RFID). It should be appreciated, however, that the EPC may be associated with or disposed on an object by any means known to those of ordinary skill in the art.

An identification (control) system includes a plurality of tag readers 14 (or more simply "readers") adapted to read the EPCs 12 within a given physical location about the reader 14. The readers 14 identify the EPC in a tag, preferably without manual intervention. For example, in the case in which RF tags are used, the readers 14 can be provided as radio-frequency sensors which can detect all RF IDS within a certain detection range around the reader.

The readers 14 collect the EPCs and provide the EPCs to a control system 16. In one particular embodiment, the control system is provided as computer system executing an operating environment referred to herein as Savant Control System (or more simply "Savant"). It should be appreciated that the location of the readers 14 are known and thus when the readers transmit EPCs to the control system 16, the control system also has information as to the location of the object associated with the EPC. Thus, the readers 14 are in communication with a processing system executing control system and the readers 14 send control the system the EPCs which have been collected.

The control system acts like a data router and performs operations such as data capturing, data monitoring and data transmission. The control system includes three major modules: an Event Management System (EMS); a Real-time in-memory data structure (RIED); and a Task Management System (TMS).

The control system 16 is in communication with an Object Name Service (ONS) server 18. The ONS server is described in detail in co-pending application Ser. No. 10/769,291, filed on even date herewith and entitled "Object Naming Service" which application is hereby incorporated herein by reference in its entirety. In operation, the control system sends a query (e.g., over the Internet) to an ONS database, which acts like a reverse telephone directory—it receive a number and produces an address.

In particular, based upon an object's tag EPC, an object can be associated with networked services. A network service is a remote service provided on a network on the Internet or a Virtual Private Network (VPN) to provide and store information regarding that object. The network may, for example, be provided as an intranet, the Internet, a virtual private network (VPN) or any other type of network. A typical network service could offer product information regarding the object.

The ONS provides a framework to locate networked services for tagged objects. Specifically, networked services for an object can be identified based on the unique EPC tagged to that object. The ONS framework helps readers, or processing units integrated with the readers, locate these services.

The ONS server 18 matches the EPC number (which may be the only data stored on an RFID tag) to the address of a server having stored thereon information about the object. In some cases the server may have an extensive amount of information about the object stored thereon. This data is available to, and can be augmented by, control systems around the world. In the exemplary embodiment shown in FIG. 1, the ONS service is used to locate Physical Markup Language (PML) servers 20 associated with an EPC. In one embodiment, the PML server 20 can be provided as a web server that serves information about that object in the Physical Markup Language.

The PML server 20 uses PML to store comprehensive data about manufacturers' products. The PML server 20 recognizes the incoming EPCs as belonging to a particular object (e.g. cans of SuperCola, Inc.'s Cherry Hydro). Because the system knows the location of the reader which sent the query, the system now also knows which plant produced the cola. If an incident involving a defect or tampering arose for example, this information would make it easy to track the source of the problem and recall the products in question.

Before describing the ONS server 18 in detail, a general overview is provided. Since only the EPC may be stored on the object tag, computers need some way of matching the EPC to information about the associated item. The Object Name Service (ONS) serves this role. The ONS is an automated networking service similar to the Domain Name Service (DNS) that points computers to sites on the World Wide Web.

When an interrogator (e.g., reader 14 in FIG. 1) reads an RFID tag (e.g. RF tag 12a in FIG. 1), the EPC read from the tag is passed on to a control system (e.g. the control system 16 described above). The control system can, in turn, communicate with an ONS on a local network or the Internet to find where information on the product is stored. The ONS points the control system to a server where a file about that product is stored. That file can then be retrieved by the control system, and the information about the product in the file can be forwarded to a company's inventory or supply chain applications.

The Object Name Service handles many more requests than the Web's Domain Name Service. Therefore, companies can maintain ONS servers locally, which will store information for quick retrieval. For example, a computer manufacturer may store ONS data from its current suppliers on its own network, rather than pulling the information off a web site every time a shipment arrives at the assembly plant. The system will also have built-in redundancies. For example, two or more servers will have the same information stored thereon. Thus, if one server with information on a certain product crashes, ONS will be able to point the Control to another server where the same information is stored.

Figure 2:
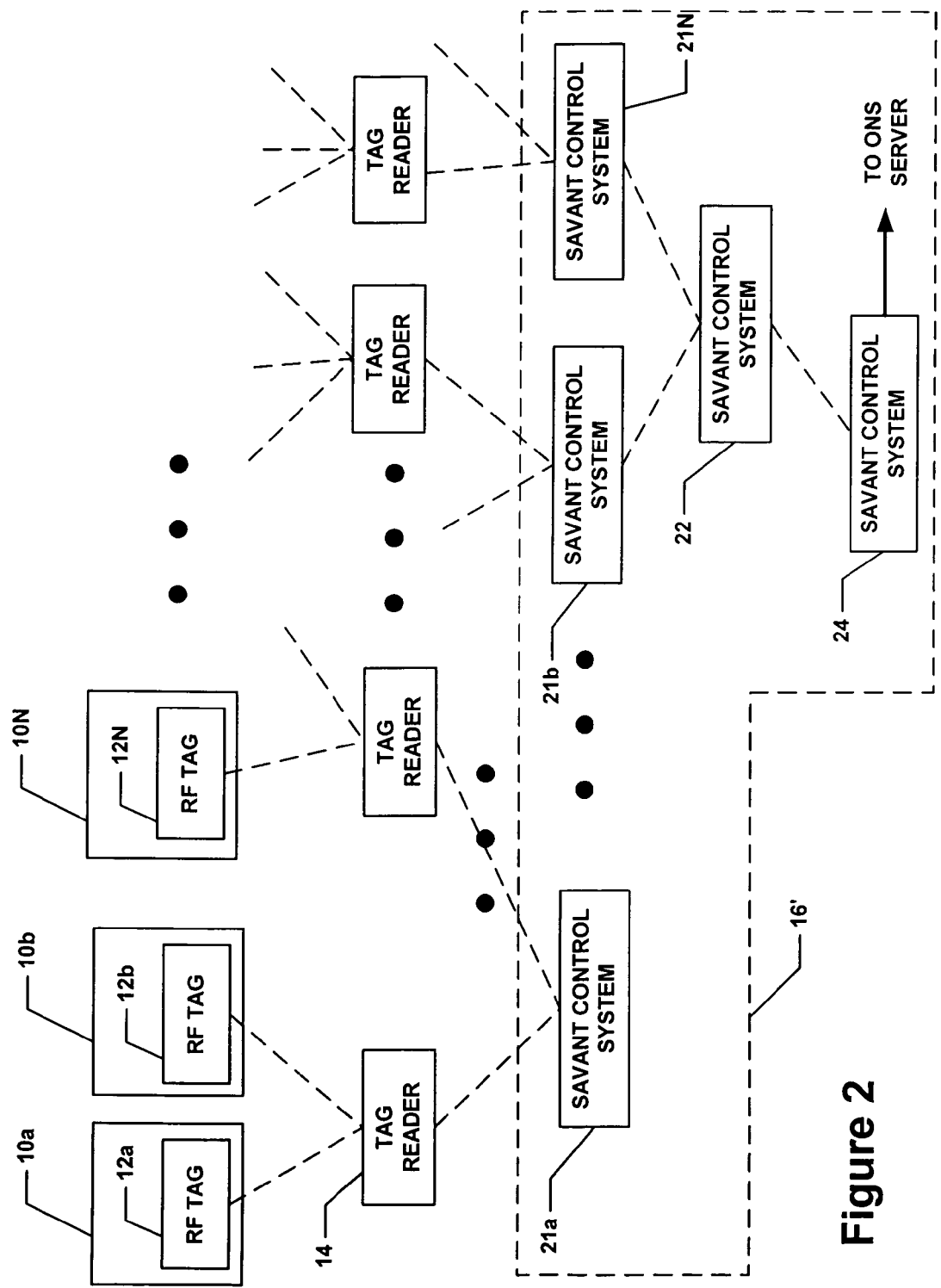
FIG. 2 is a block diagram of hierarchical control system.

Referring now to FIG. 2, a Savant control system 16' which may be similar to system 16 described above in conjunction with FIG. 1 is shown. The Savant control system 16' is provided from a plurality of control systems 21a-n, 22a-22n, and 24 arranged in a hierarchical structure. In this particular example a three-level hierarchy is shown with control system 24 corresponding to a root of the hierarchy with control systems 21a-21n corresponding to the outermost (or "leaf" or "edge") control systems in the hierarchy. Those of ordinary skill in the art will appreciate of course that more or fewer than three levels may be used in the hierarchy. The particular number of levels to use in the hierarchy will depend on a number of factors including but not limited to the particular application, physical constraints, cost and the like.

Control systems 16a-16N generally denoted 16 at the edge of the network (i.e. those control systems attached to readers 14) will smooth data. Not every tag is read every time, and sometimes a tag is read incorrectly. By using algorithms, the control system is able to correct these errors. If the signals from two readers overlap, they may read the same tag, producing duplicate EPCs. One of the control system's jobs is to analyze reads and delete duplicate codes. The information collected by the edge control systems 16 is passed to another control system (e.g., control system 22) further up the hierarchy (data forwarding). At each level 16, 22, 24 the control system has to decide what information needs to be forwarded up or down the chain. For instance, a control system in a cold storage facility might forward only changes in the temperature of stored items. It should be appreciated that while three control system levels are here shown, any number of control system levels can be used.

Existing databases typically can't handle more than a few hundred transactions per second, so another job of the control systems is to maintain a real-time in-memory event database (RIED). In essence, the system will take the EPC data that is generated in real time and store it intelligently, so that other enterprise applications have access to the information, but databases aren't overloaded.

All control systems 16, 22, 24, regardless of their level in the hierarchy, include a Task Management System (TMS), which enables them to perform data management and data monitoring using customizable tasks. For example, a control system running in a store might be programmed to alert the stockroom manager when product on the shelves drops below a certain level.

Figure 3:
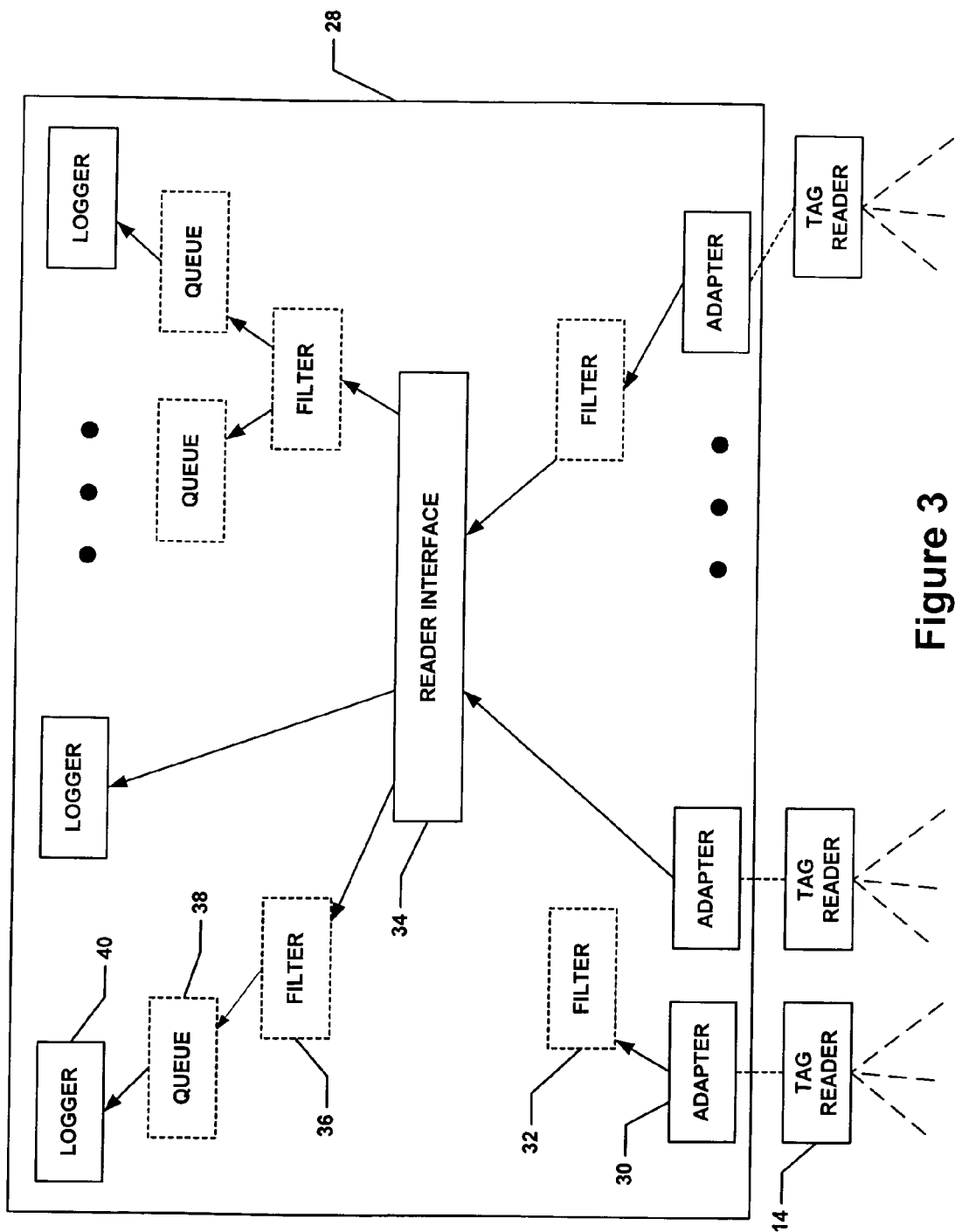
FIG. 3 is a block diagram of an event management system (EMS)

Referring now to FIG. 3, an event management system (EMS) 28 is shown. The EMS provides a framework to collect, process, and store reads by a reader. The EMS is responsible for several functions including allowing adapters to be written for various types of readers; collecting EPC data from readers in a standard format; allowing filters to be written to smooth or clean EPC data; allowing various loggers to be written, such as database loggers to log EPC data into the database, network loggers to broadcast EPC data to remote servers; and buffering events to enable loggers, filters and adapters to operate without blocking each other.

The EMS 28 receives events from readers 14 at adapters 30. Reader adapters 30 communicate directly or indirectly with readers and gather information about the events detected by the readers. The reader adapter 30 then writes these events to the reader interface 34 through an optional filter 32.

The Reader Interface 34 allows reader adapters 30 to communicate events detected by the tag readers 14. The reader adapters 30 communicate with readers 14 to capture EPC events. The reader adapters 30 are event producers that post the reader events to any event consumer that implements the reader interface 34.

The reader interface 34 is coupled through optional filters and queues 36, 38 to event loggers 40. Event loggers 40 correspond to various implementations of the reader interface and allow for varied processing of events. For example, one implementation of the reader interface can store the information in the database, another implementation of the reader interface can store the events in a memory data structure, and yet another can broadcast the events to one or more remote servers using Hyper Text Transfer Protocol (HTTP), Java Message Service (JMS) or Simple Object Access Protocol (SOAP) protocols. Event Loggers are also called event consumers, since they consume incoming events in a stream.

The event queues 38 provide an asynchronous queuing system that handles multiple reader event loggers with synchronous implementations. The queuing system records events read by various reader adapters, and posts these events to all of the reader event loggers registered with the system. Event loggers can register and unregister from the event queue in real time.

The queuing system increases the throughput of the system using multi-processing. For example, a database event logger, which would consume most of its time in disk reads and writes, will not reduce the speed of a network event logger that posts real-time events to a remote server. Since event queues are neither producers nor consumers of events, they are called event forwarders.

The event filters 32, 36 handle one incoming event stream and post the events to one or more output streams. Unlike event queues 38, event filters 32, 36 are usually synchronous implementations. Event filters can be added between event producers and event consumers to perform smoothing, coordination or forwarding.

The above processing units are arranged in a Directed Acyclic Graph (DAG) by the EMS system when it starts up. The EMS starts up each processing unit only after its dependencies have been started up. An EMS configuration file defines this DAG. On startup, the EMS configuration parser loads this file and sets up the processing units as specified in that file.

Any provider can implement the EMS interfaces and use the implemented EMS unit in the control system. Using the EMS framework, the control system can configure adapters, filters and loggers provided by multiple software vendors, to process tag data.

RIED is an in-memory database that can be used to store event information gathered by the Event Management System. The RIED system is a high-performance, multi-versioned in-memory database.

Applications can access RIED using Java Data Base Connectivity (JDBC) or a native Java interface. RIED supports SQL operations such as SELECT, UPDATE, INSERT and DELETE. RIED supports a subset of data manipulation operations defined in SQL92.

RIED is a relatively simple, high-performance, multi-versioned in-memory database that can be used to store event information gathered by the Event Management System. RIED can maintain "snapshots" of the database at different timestamps. Furthermore, as will be described below, the time taken by RIED to create a new snapshot is a constant-time operation. Old snapshots of observations are required for queries such as counting the inventory, and backing up RIED to the database. RIED is capable of holding multiple read only snapshots of outdated information. For example, the database could hold two outdated snapshots of all observed tags, one at the beginning of the day, and the other at the beginning of the minute Typical control system application units perform frequent updates on the event information. For instance, every tag read would be associated with an update operation on the database to register the last read time of that tag. Most in-memory databases are suited for applications that spend more time in queries than in updates. When performing a large query on the in-memory database, such as getting a list of all tags detected by readers, while performing frequent updates, typical databases may perform inefficiently.

RIED is capable of holding multiple read-only snapshots of outdated information. A snapshot is a copy of the current state of the database that can be queried, but not modified. Consequently, an application scanning over all event data can perform the query on a consistent version of the database, while other routines update the event data.

RIED transactions are applied sequentially. Specifically, at any time only one transaction operates on the latest state of the database. Every transaction taking place in RIED is assigned a sequence number. A sequence manager maintains the latest sequence number and a list of sequence numbers corresponding to outdated snapshots in the database. Every snapshot can be referenced with a snapshot name. The RIED system is configured with a fixed number of snapshot names during startup.

As mentioned above, RIED uses versioned data structures for snapshot maintenance. In contrast, conventional existing in-memory database systems do not provide such support for efficient management of persistent information.

Versioned data structures perform updates on the latest snapshot and queries on all previous snapshots. The multi-versioned database is implemented as follows:

Suppose the database holds n snapshots $(S_0, S_1 \ldots S_n)$. A sequence manager holds the sequence numbers associated with each snapshot $S_i$ as $T_i$ for example. The sequence manager supports the following operations:
 a. increment $T_0$: every update operation increases the sequence number of the latest snapshot $S_0$.
 b. synchronize $S_i$: every snapshot synchronization operation makes the snapshot $S_i$ correspond to the currently latest snapshot. This operation is implemented by setting $T_i$ to $T_0$, which makes the operation a constant-time operation.

Versioned data structures need not be modified when the sequence manager performs the two above operations. This allows the RIED system to perform updates and state synchronizations in constant time.

One type of versioned data structure used by the RIED system is known as persistent datum. This data structure maintains the history of a data item for every snapshot. RIED table rows are stored in persistent data items. Each datum holds n items with the sequence numbers associated with them. On any search operation that queries the data item's value for a certain version, the persistent datum returns the data item associated with the latest sequence number smaller than the version's sequence number.

A valid version of the data item is a version that corresponds to the latest update before some snapshot sequence number $T_i$. Not all versions maintained in the persistent datum are valid data items. However, any update operation performed on a persistent datum ensures that invalid versions are removed when necessary.

A second type of versioned data structure used by the RIED system is known as persistent set. This data structure maintains the history of a set of data items. RIED 30 table index contents are stored in persistent sets. Specifically, all the primary keys that share the same index column value are stored in one persistent set.

The persistent set allows query operations to retrieve all items in the set and update operations to add or remove items from the set. As in the persistent datum, the persistent set maintains versions of object membership values that determine if an object is present or absent in a set. Update operations remove unnecessary objects from this set depending on the same validity principle used in persistent datums.

A third type of versioned data structure used by the RIED system is known as a hash table. The hash table is a high-speed constant-time search data structure. Hash tables are used to maintain tables as mappings from primary keys to persistent datums containing the row values. They are also used to maintain table indexes. Here the hash table maintains mappings from indexed column values to persistent sets of the corresponding primary keys.

Transaction management involves support for COMMIT and ROLLBACK operations on transactions. All updates performed by a transaction are stored in a rollback buffer. On a COMMIT operation, all updates enqueued in the rollback buffer are written to the table and table index data structures. On a ROLLBACK operation, this buffer is emptied out.

The RIED transaction manager supports only one transaction at a time. This means that every transaction blocks other transactions from updating the RIED database. Such a transaction management method is necessary to avoid the high cost of locking and unlocking memory data structures. A typical wait/notify cycle implemented using semaphores can take a few microseconds. This rules out the possibility of performing fine-grained row-level locking in the RIED system.

Queries made on the latest snapshot of the RIED system will first look at the rollback buffer, and then search the other memory data structures. This behavior ensures that updates made by a transaction are visible within that transaction even before a COMMIT operation. Queries made on older states however will not look at the rollback buffer, thereby ensuring that there are no dirty reads in the system.

EMS can be implemented as a pure-Java package providing Java interfaces for the above mentioned EMS units. The RIED implementation may also be realized as a pure-Java implementation that uses Another Tool for Language Recognition (ANTLR) to parse the SQL Data Definition Language and the Data Manipulation Language.

The TMS implementation may also be a Java implementation that provides task scheduling using schedule configuration similar to UNIX crontab.

Figure 4:
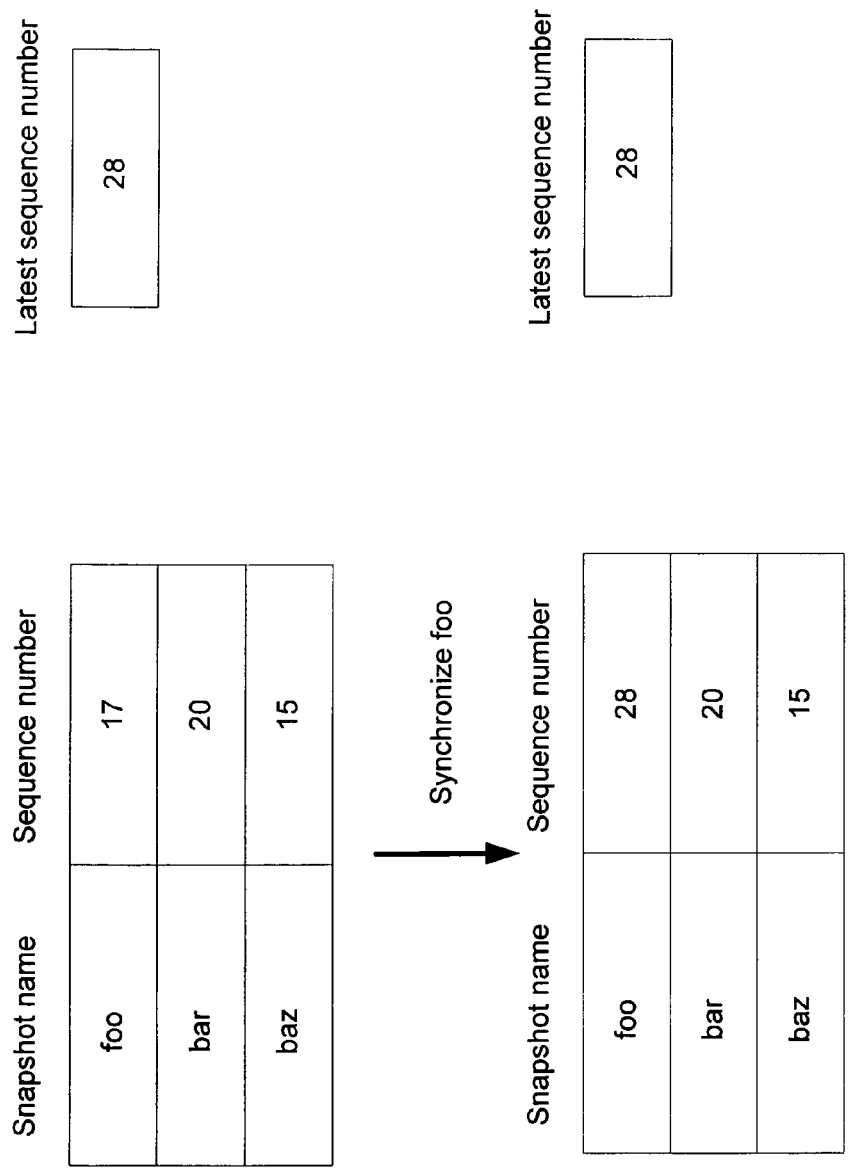
FIG. 4 is a series of tables which illustrate a synchronization operation.

Referring now to FIG. 4, to exploit RIED versioning, applications can synchronize a snapshot referenced by its name to the latest state of the database. As shown in FIG. 4, an application synchronizes the state of the snapshot named "foo" to the latest sequence number (28). The figure also illustrates the manner in which the sequence manager maintains the snapshot sequence numbers. Note that after the synchronization of the snapshot "foo", its sequence number is set to 28 which indicates that the snapshot has been synchronized to the latest sequence number.

Figure 5:
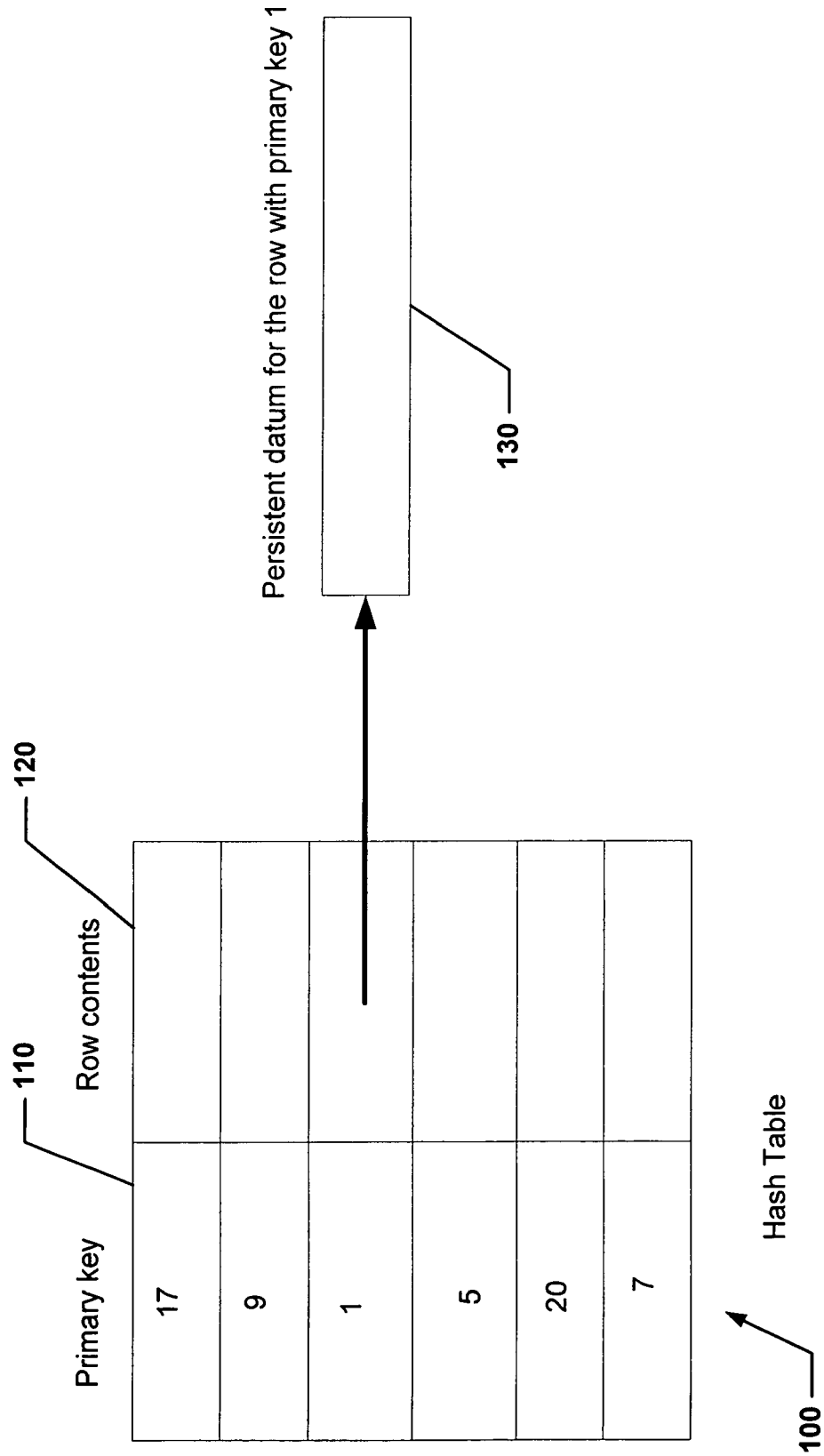
FIG. 5 is a persistent datum Hash table.

Referring now to FIG. 5, every table in RIED is stored in a hash table 100. The primary key 110 of every record in the table 100 is maintained as a key in the hash table. The value associated with the key is a persistent datum holding the contents of the row 120. FIG. 5 illustrates a table stored in this format. Every value stored in the hash table is a persistent datum. FIG. 5 shows the persistent datum 130 for the row with primary key 1.

Referring now to FIG. 6, each index in RIED is also stored in a hash table 150. The key maintained by the hash table 150 corresponds to a value in the indexed primary key column 160. However, unlike the primary key of a table, an indexed key could be the same for more than one record in the table. For each indexed value, RIED stores the primary keys of the records having that indexed value in a persistent set. FIG. 6 illustrates an index stored in this format. Every value stored in the hash table points to a persistent set of primary keys 170.

All query paths accessing the rows in a table using a primary key can load the row associated with a given primary key in constant time. Based on the snapshot of the database in which the query is performed, the persistent datum returns the appropriate row. Similarly query paths accessing the rows in a table using an indexed key can load the row associated with a given indexed key in constant time. Based on the snapshot of the database in which the query is performed, the persistent set will return the appropriate set of primary keys that have the given indexed value.

The persistent datum data structure allows support for certain operations. These operations include the ability to perform a query of the latest value of the datum, perform a query of the value of the datum at a given sequence number, and update the value of the datum.

The persistent datum is an array of versioned items. The size of the array is one more than the number of snapshots maintained. Each versioned item in the array holds the sequence number and the value of the data item set at that version number. The sequence number maintained in the versioned item is monotonically non-increasing for increasing indexes.

FIG. 7 shows a sample persistent datum 130. When the latest value of the datum is queried, the first data item held in the item in the array is returned. For the datum shown in FIG. 7 the value "four" will be returned.

When the value of the datum at a given sequence number is queried, the persistent datum will return the data item corresponding to the first (based on increasing array index) versioned item in the array with the sequence number less than or equal to the given sequence number. For example, in FIG. 7, the data item "two" will be returned as the value of the datum for sequence number 18 since the first sequence number less than or equal to sequence number 18 is sequence number 17, thus the data item for sequence number 17 is returned.

On an update operation, the persistent datum uses the sequence manager to determine an invalid versioned item. A versioned item is valid if it can be accessed by querying the latest value of the datum, or by querying based on the sequence number of a snapshot defined in the sequence manager. Since the latest value of the datum is the currently updated value, the persistent datum can have at most n valid items before an update, where n is the number of snapshots maintained. The array however holds n+1 items, which means that there is at least one invalid versioned item. This item will be overwritten during the update process.

Figure 8:
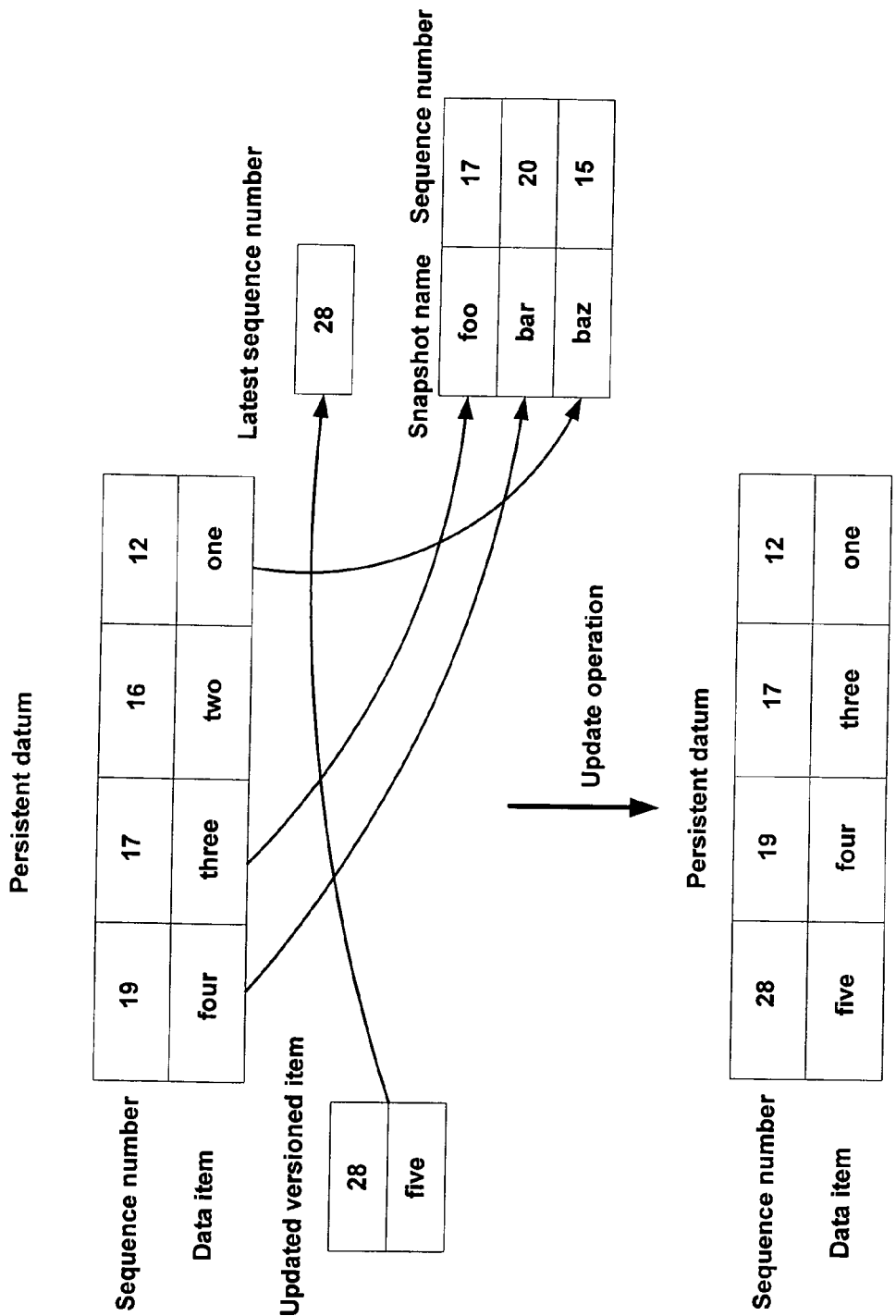
FIG. 8 is a series of tables which illustrate an update operation.

FIG. 8 illustrates an update operation. The valid items are linked with curved lines to the snapshot for which they are relevant. The invalid item is "two" updated at sequence number 16. After the update operation, this invalid item is removed, and sequence number 28 having data item "five" is inserted into the persistent datum. The updated persistent datum now includes the latest sequence number (28), as shown in FIG. 8.

All operations on a persistent datum can be performed in constant time, since the number of versions maintained is a constant. Persistent sets are maintained as persistent datums with data items corresponding to additions (ADD) and removals (DEL) from the set. Unlike the persistent datum however, the array maintaining the persistent set keeps growing.

Figure 9:
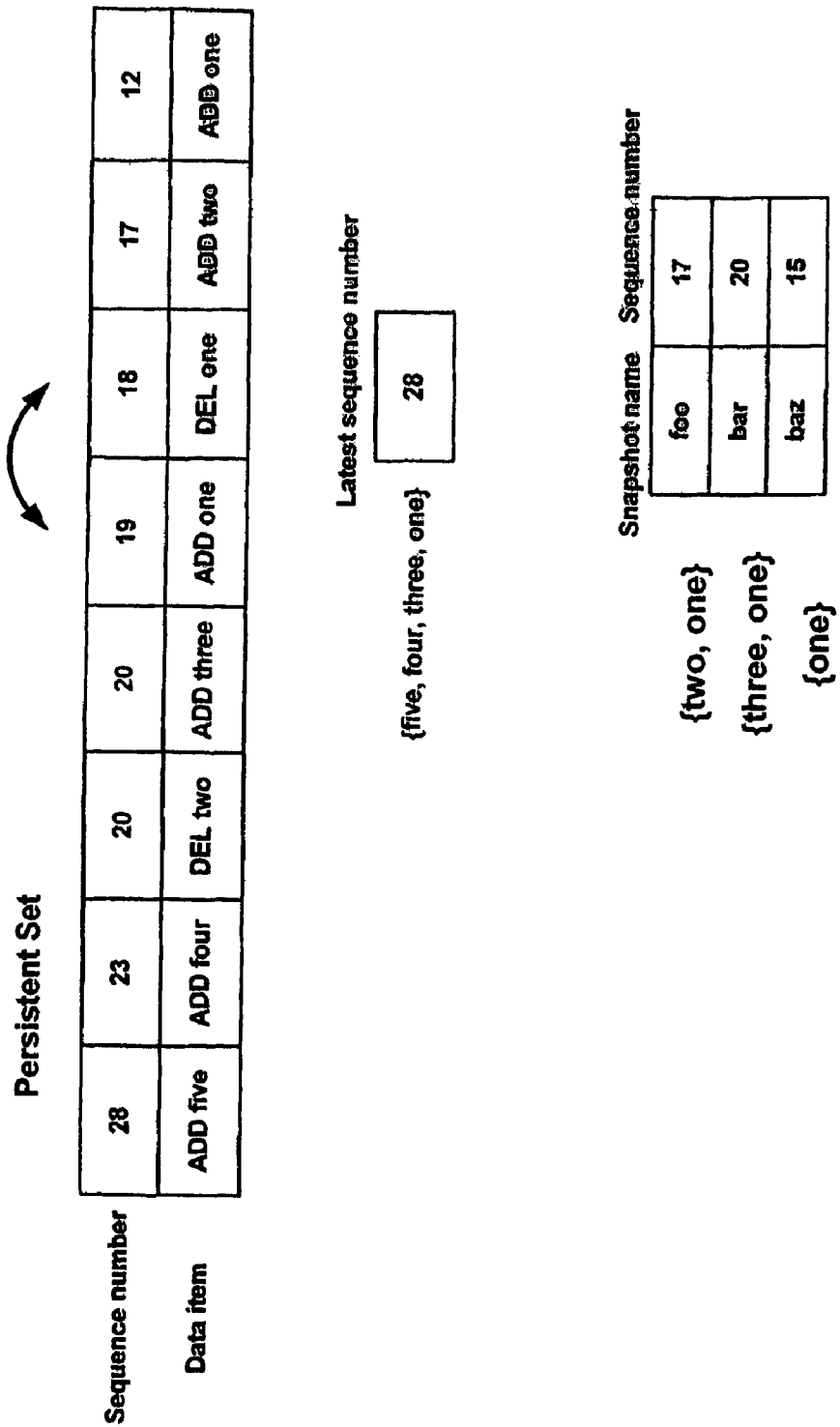
FIG. 9 is a series of tables which illustrate a persistent set along with the results of queries in various snapshots.

FIG. 9 illustrates a persistent set along with the results of queries in various snapshots. An update operation causes the addition of a versioned data item to the beginning of the array. A query is performed by traversing the array from right to left (in decreasing order of indexes). The set is constructed as ADD and DEL records are encountered. This process stops when a versioned item with sequence number greater than the sequence number specified by the query is encountered.

On any query, update or versioned query operation, all invalid items in the array are removed. Invalid items in the persistent set occur in pairs of addition and removal records on the same value.

A pair of invalid items is shown in FIG. 9. The deletion of "one" at sequence number 18 followed by its addition in sequence number 19 cannot be detected by performing queries on any of the snapshots. For example, a query of snapshot foo would be detected by persistent datum sequence number 17, while a query of snapshot bar would be detected by persistent datum number 20 and a query of snapshot baz would be detected by persistent datum sequence number 12. There is no query of the snapshots however that would be detected by persistent datum sequence numbers 19 and 18, therefore they are deemed invalid.

Having described preferred embodiments of the invention it will now become apparent to those of ordinary skill in the art that other embodiments incorporating these concepts may be used. Additionally, the software included as part of the invention may be embodied in a computer program product that includes a computer useable medium. For example, such a computer usable medium can include a readable memory device, such as a hard drive device, a CD-ROM, a DVD-ROM, or a computer diskette, having computer readable program code segments stored thereon. The computer readable medium can also include a communications link, either optical, wired, or wireless, having program code segments carried thereon as digital or analog signals. Accordingly, it is submitted that the invention should not be limited to the described embodiments but rather should be limited only by the spirit and scope of the appended claims. All publications and references cited herein are expressly incorporated herein by reference in their entirety.

What is claimed is:

1. A system for controlling the collection, storing, and use of data in an RFID system, comprising:

an event management system (EMS) connected for receiving data from at least two RFID tag readers, said event management system being configured for processing said data and for logging the data to a database;

means for maintaining a real-time in-memory event database (RIED) wherein said RIED comprises a versioned data structure having an updated snapshot of the database maintained by said EMS and an outdated snapshot of said database; and a task management system configured for monitoring data in said RIED and performing a task in response to a status of the monitored data;

wherein the RIED maintaining means comprises a sequence manager that identifies the database snapshots with indicia that indicates a sequence in which the database snapshots were obtained and the sequence manager is configured to identify the plurality of database snapshots with a unique name and a sequence number that corresponds to a time at which a database snapshot was taken; and wherein the versioned data structure of the RIED maintaining means comprises a persistent datum data structure, wherein each version of a data item in the RIED is stored with its associated sequence number, such that in response to a query or search for a data item of a desired version, the RIED maintaining means returns a version of the data item with a latest sequence number smaller than the desired version's sequence number.

2. A system as set forth in claim 1 wherein the outdated snapshot of said database is a read only database.

3. A system as set forth in claim 1 wherein the versioned data structure of the RIED maintaining means comprises a plurality of outdated database snapshots each being chronologically different from each other.

4. A system as set forth in claim 3 wherein the outdated snapshots of said database are read only databases.

5. A system as set forth in claim 1 wherein the versioned data structure of the RIED maintaining means comprises a persistent set data structure, wherein versions of data items are stored in sets based on a common data item indexing value, such that in response to a query or search for data items of a desired version, the RIED maintaining means returns a set of data items having a common indexing value.

6. A system as set forth in claim 5 wherein the versioned data structure of the RIED maintaining means comprises a hash table that maintains a table index as a mapping from an indexed column value to a persistent set of corresponding keys.

7. A system as set forth in claim 1 wherein the versioned data structure of the RIED maintaining means comprises a hash table that maintains a data table as a mapping from a primary key to a persistent datum containing a row value.

8. A system as set forth in claim 1 wherein the EMS comprises a data adapter for receiving RFID tag data from at least one of the tag readers and providing the data in a standard format.

9. A system as set forth in claim 8 wherein the EMS comprises a data filter for receiving the tag data from the data adapter to clean or smooth the tag data.

10. A system as set forth in claim 9 wherein the EMS comprises a reader interface for receiving the data from the data filter and for communicating the data to a data event consumer that implements the reader interface.

11. A system as set forth in claim 10 wherein the data event consumer comprises a data logger for receiving data from the reader interface and logging the data to the database or broadcasting the data to a remote server.

12. A system as set forth in claim 11 wherein the EMS comprises a plurality of data loggers and a data event queue for asynchronously providing event data to the data loggers.

13. A system as set forth in claim 8 wherein the EMS comprises a reader interface for receiving the data from the data adapter and communicating the data to a data event consumer that implements the reader interface.

14. A system as set forth in claim 13 wherein the data event consumer comprises a data logger for receiving data from the reader interface and logging the data to the database or broadcasting the data to a remote server.

15. A system as set forth in claim 14 wherein the EMS comprises a plurality of data loggers and a data event queue for asynchronously providing event data to the data loggers.

16. A system for controlling the collection, storing, and use of data in an RFID system, comprising:
   an event management system (EMS) connected for receiving data from at least two RFID tag readers, said event management system being configured for processing said data and for logging the data to a database;
   means for maintaining a real-time in-memory event database (RIED) wherein said RIED comprises a versioned data structure having an updated snapshot of the database maintained by said EMS and an outdated snapshot of said database; and
   a task management system configured for monitoring data in said RIED and performing a task in response to a status of the monitored data;
   wherein the EMS comprises a data adapter for receiving RFID tag data from at least one of the tag readers and providing the data in a standard format and a data filter for receiving the tag data from the data adapter to clean or smooth the tag data.

17. A system as set forth in claim 16 wherein the outdated snapshot of said database is a read only database.

18. A system as set forth in claim 16 wherein the versioned data structure of the RIED maintaining means comprises a plurality of outdated database snapshots each being chronologically different from each other.

19. A system as set forth in claim 18 wherein the outdated snapshots of said database are read only databases.

20. A system as set forth in claim 16 wherein the RIED maintaining means comprises a sequence manager that identifies the database snapshots with indicia that indicates a sequence in which the database snapshots were obtained.

21. A system as set forth in claim 20 wherein the sequence manager is configured to identify the plurality of database snapshots with a unique name and a sequence number and wherein said sequence number corresponds to a time at which a database snapshot was taken.

22. A system as set forth in claim 21 wherein the versioned data structure of the RIED maintaining means comprises a persistent datum data structure, wherein each version of a data item in the RIED is stored with its associated sequence number, such that in response to a query or search for a data item of a desired version, the RIED maintaining means returns a version of the data item with a latest sequence number smaller than the desired version's sequence number.

23. A system as set forth in claim 22 wherein the versioned data structure of the RIED maintaining means comprises a persistent set data structure, wherein versions of data items are stored in sets based on a common data item indexing value, such that in response to a query or search for data items of a desired version, the RIED maintaining means returns a set of data items having a common indexing value.

24. A system as set forth in claim 23 wherein the versioned data structure of the RIED maintaining means comprises a hash table that maintains a table index as a mapping from an indexed column value to a persistent set of corresponding keys.

25. A system as set forth in claim 22 wherein the versioned data structure of the RIED maintaining means comprises a hash table that maintains a data table as a mapping from a primary key to a persistent datum containing a row value.

26. A system as set forth in claim 16 wherein the EMS comprises a reader interface for receiving the data from the data adapter and communicating the data to a data event consumer that implements the reader interface.

27. A system as set forth in claim 26 wherein the data event consumer comprises a data logger for receiving data from the reader interface and logging the data to the database or broadcasting the data to a remote server.

28. A system as set forth in claim 27 wherein the EMS comprises a plurality of data loggers and a data event queue for asynchronously providing event data to the data loggers.

29. A system as set forth in claim 16 wherein the EMS comprises a reader interface for receiving the data from the data filter and for communicating the data to a data event consumer that implements the reader interface.

30. A system as set forth in claim 29 wherein the data event consumer comprises a data logger for receiving data from the reader interface and logging the data to the database or broadcasting the data to a remote server.

31. A system as set forth in claim 30 wherein the EMS comprises a plurality of data loggers and a data event queue for asynchronously providing event data to the data loggers.

* * * * *

UNITED STATES PATENT AND TRADEMARK OFFICE
CERTIFICATE OF CORRECTION

PATENT NO. : 7,621,447 B1
APPLICATION NO. : 10/769292
DATED : November 24, 2009
INVENTOR(S) : Sarma et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 557 days.

Signed and Sealed this

Twenty-sixth Day of October, 2010

David J. Kappos
*Director of the United States Patent and Trademark Office*